(12) United States Patent  (10) Patent No.: US 6,583,357 B2
Rubenstein et al.  (45) Date of Patent: Jun. 24, 2003

(54) CABLE RETENTION SYSTEM

(75) Inventors: Brandon Rubenstein, Loveland, CO (US); Bradley E Clements, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/911,603

(22) Filed: Jul. 24, 2001

(65) Prior Publication Data

US 2003/0019649 A1 Jan. 30, 2003

(51) Int. Cl.$^7$ ................................................ H02G 3/18
(52) U.S. Cl. .................. 174/65 R; 174/135; 16/2.1; 248/56
(58) Field of Search ............................. 174/65 R, 65 G, 174/65 SS, 135, 152 G, 153 G; 16/2.1, 2.2; 298/56, 73, 68.1

(56) References Cited

U.S. PATENT DOCUMENTS

| 3,567,165 | A | * | 3/1971 | White ...................... 248/68.1 |
| 5,767,449 | A | | 6/1998 | Gronowicz, Jr. |
| 6,133,529 | A | * | 10/2000 | Gretz ........................ 174/65 R |
| 6,164,987 | A | | 12/2000 | Mirabella et al. |
| 6,241,398 | B1 | | 6/2001 | Correa et al. |
| 6,248,952 | B1 | * | 6/2001 | Reeves et al. ............ 174/65 R |
| 6,352,224 | B1 | * | 3/2002 | Collins ........................ 248/73 |
| 6,353,186 | B1 | * | 3/2002 | Dams et al. .............. 174/65 G |
| 6,375,129 | B2 | * | 4/2002 | Koziol ...................... 248/68.1 |
| 6,433,278 | B1 | * | 8/2002 | Blank et al. .............. 174/65 R |
| 6,459,517 | B1 | | 10/2002 | Duncan et al. |

FOREIGN PATENT DOCUMENTS

EP  0780924 A2  8/1997

* cited by examiner

*Primary Examiner*—Dean A. Reichard
*Assistant Examiner*—Dhiru R Patel

(57) ABSTRACT

A cable retention device includes a conduit that is joined to an end plate forming a continuous passage through the conduit. Cable shielding is clamped to the conduit to establish a pathway to ground. The end plate presents a shoulder face that is inserted into a guide rail clamp. The shoulder face includes a pair of arches that function as fulcrums to flex the guide rail bracket, which secures the cable retention device to a chassis under compressive force.

19 Claims, 4 Drawing Sheets

CABLE RETENTION SYSTEM

BACKGROUND OF THE INVENTION

1. Field of the Invention

The invention pertains to the field of fittings and adaptors that can be used to secure insulated electrical cables for the transmission of signals. More specifically, the fittings and adaptors are used to retain cables that are shielded from the effects of electromagnetic disturbances.

2. Discussion of the Related Art

Cables for use in transmitting electronic signals are often provided with shielding in the form of foil, wire mesh or screen material that surrounds one or more central insulated leads. One common example of this type of cable is the coaxial cable that is used to carry television or data transmissions. The shielding itself is usually covered with an external layer of insulation. The shielding protects the wanted signal that is being transmitted on the central lead from ambient electromagnetic disturbances. The shielding also limits the amount of electromagnetic disturbance that is transmitted outwardly from the central lead. For these reasons, shielded cables are increasingly utilized in densely packed arrays of electrical equipment.

A variety of connectors are used to secure and interconnect these cables. Typically, bulkhead connectors, which connect the shielding to a ground at the terminus of the cable, are used for shielded cables. Nevertheless, it is not always desirable or practical to connect the cable to ground at its terminus. For example, U.S. Pat. No. 5,975,953 to Peterson describes the difficulties and special considerations that are involved when connecting electromagnetic interference (EMI) shielded cables directly to an input/output (I/O) card and having to shunt the ground path through the I/O card.

Further, in the case of bulkhead connectors, a continuing problem exists with securing the cables against unwanted motion that can, for example, cause signal degradation by torsional or translational motion of the cable. Prior systems are unable to secure the cable against unwanted motion while providing a ground for the EMI shielding. Separate structures, such as a rubber grommet that is separate from the bulkhead connector are required for these purposes.

Regulatory agencies are promulgating ever stricter regulations that increasingly limit the amount of EMI that electronic equipment may generate. Additionally, stricter EMI limits are necessarily imposed by the practicalities of operating computer and telecommunications systems at increasingly faster rates of data transmission.

SUMMARY OF THE INVENTION

The cable retention device that is shown and described herein overcomes the aforementioned problems and advances the art by providing a shielded cable retention device that provides an EMI ground connection at a location other than the cable terminus. The cable retention device is particularly effective in providing shield protection at a point where the cable passes through a chassis that may house, for example, a computer or other electrical equipment making use of shielded cables.

A cable retention device according to the preferred embodiments described herein comprises a conduit having an exterior wall operably configured to receive the shielded cable and an end plate having an aperture. The conduit presents an exterior surface. An end plate defines an aperture, and the conduit is joined with the end plate at the aperture so that the conduit's passageway is continuous through the end plate. A clamp, such as a metal band, has dimensions compatible with the conduit's exterior surface. The clamp circumscribes a portion of the conduit's exterior surface and retains a piece of the cable shielding between the clamp and the portion of the exterior surface, thus grounding the shielding to the conduit when the conduit is made of a conductive material establishing a pathway to ground.

The conduit may be any tubular member, such as a cylinder or square tube, or may be non-encapsulating, such as a channel. The conduit preferably but optionally presents an axis of symmetry, and the end plate may comprise at least one male boss protruding transversely with respect to the axis of symmetry. In this case, the end plate preferably also comprises a female slot located distal from the male boss. The female slot has compatible dimensions for receipt therein of members of identical size in respect to the male boss when such members are available for receipt within the female slot. This arrangement of bosses and slots permits identical units formed of conduits and end plates to be stacked atop one another where the slots and bosses locate or index the respective units in fixed positional relationship with respect to one another. The conduit and the end plate may be joined by any mechanism, for example, including press fits, integral formation of parts, or a bonding composition such as an adhesive or solder.

Especially preferred end plates present a rearward face forming a plane in transverse orientation with respect to the axis of symmetry of the conduit. The end plate comprises an alignment ear protruding beyond the rearward face, which serves to locate or index each of the end plate-cylinder units with respect to a chassis or other mounting structure.

In other preferred but optional embodiments, the end plate comprises a shoulder having a fulcrum. A guide rail mounting bracket has an opening of sufficient size to permit passage of the conduit while not permitting passage of the shoulder. The guide rail preferably has a first end and a second end distal from the first end. The first end comprises a mounting tab for use in retaining the guide rail in complimentary mounting structure on the chassis when the guide rail is installed in the complimentary mounting structure. The second end comprises an opening with a threaded fastener received therein for use in demountably attaching the guide rail to the complimentary mounting structure when the guide rail is installed in the complimentary mounting structure. The fulcrum is used in flexing the guide rail under force exerted by the threaded fastener when the guide rail is installed in the complimentary mounting structure.

The aforementioned structure including a conduit and an end plate that are joined to present a continuous passageway, facilitates a method of retaining a shielded cable. The method comprises the steps of clamping the end plate in a bracket or guide rail, removing insulation from the insulated and shielded cable to expose shielding in the cable, positioning the shielding around the conduit, and clamping the shielding to the conduit. The section of cable that resides within the cable is, thus, not crimped or pinched in a manner that could cause signal degradation.

DETAILED DESCRIPTION OF THE PREFEERRED EMBODIMENTS

Figure 1:
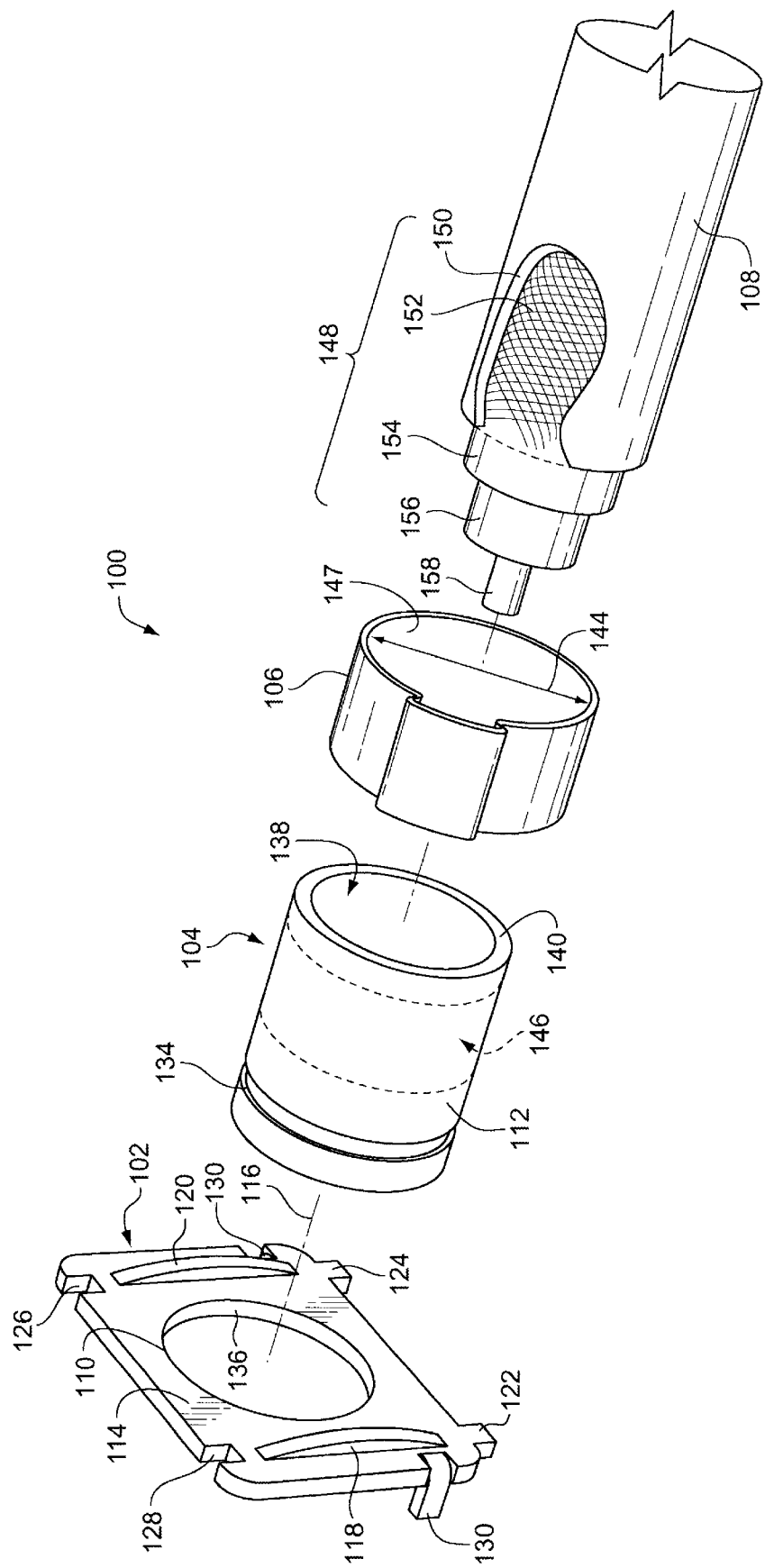
FIG. 1 is a right, front elevational assembly view illustrating various components of a preferred cable retention device.

FIG. 1 depicts a right front assembly view of a cable retention device 100 including an end plate 102 that is press-fit with a cylindrical conduit 104. A clamp 106 is used to retain a shielded cable 108 on the conduit 104 in a manner that does not compress or kink the shielded cable 108. The end plate 102 and conduit 104 are preferably made of a conductive material, such as brass, steel, or conductively enhanced plastic.

The end plate 102 defines an aperture 110 of sufficient dimensions to circumscribe an exterior surface 112 of the conduit 104. Thus, once assembled with the cylinder 104, the end plate 102 essentially forms a shoulder surrounding the cylinder 104 and includes a front face 114 extending transversely with respect to an axis of symmetry 116 in the conduit 104. A pair of arches 118 and 120 rise from front face 114 and function as fulcrums in flexion of a guide rail mounting bracket that is to be discussed in the context of additional figures.

In preferred but optional embodiments, a pair of male bosses 122 and 124 protrude downwardly from the end plate 102 in a transverse direction with respect to the axis of symmetry 116. These male bosses 122 and 124 have dimensions that are mateable with a pair of female slots 126 and 128 of an identical adjacent end plate (not shown). This combination of male bosses and female slots is used, for example, to stabilize in fixed positional relationship a plurality of units formed of identical end plates 102 and conduits 104 when the units are stacked vertically one upon the other.

The end plate 102 is preferably but optionally provided with a pair of alignment ears 130 and 132 that extend rearwardly from the front face 114 and laterally from end plate 102 in parallel with the axis of symmetry 116. These ears 130 and 132 are used as additional locating devices that stabilize the cable retention device 100 when the ears are mated with complimentary mounting structure, such as holes in a chassis (not shown).

The end plate 102 is not limited to the generally planar structure shown in FIG. 1, and may comprise any number of additional shapes, such as a block, semisphere or rod having an arcuate shape out to the limits of arches 118 and 120.

The exterior surface 112 of conduit 104 is circumscribed by a groove 134 with which the interior surface 136 of the end plate 102 is press-fit, in preferred embodiments. Thus, the assembly of end plate 102 and conduit 104 establishes continuity of a passageway 138 formed by the exterior wall 112 through end plate 102 and aperture 110. This passageway proceeds from a first end 140 of conduit 104 to a second end 142. As alternative joining mechanisms to a press-fit, the conduit 104 may also be soldered, adhesively bonded, or integrally formed with end plate 102.

The clamp 106, according to preferred but optional embodiments, is preferably a thin metal band of a type that may be crimped by conventional tools to reduce an internal diameter 144. The internal diameter 144 is sufficient to circumscribe a portion, e.g., portion 146 of the exterior wall 112. As is discussed in greater detail in the context of additional figures, the internal diameter 144 of clamp 106 is also sufficient to receive selected portions of shielded cable 108 for retention of these selected portions between the internal diameter surface 147 and the exterior wall 112.

The shielded cable 108 may be any conventional shielded cable having one or more leads for the transmission of data signals. In FIG. 1, a section 148 is shown to illustrate, by way of example, various midsectional components of the shielded cable 108. An outer elastomeric insulation layer 150 has been removed to reveal, for purposes of illustration only, an internal layer of wire mesh or braid shielding 152. Optional layers of bulk, for example, including additional insulation or shielding 154 concentrically surround additional plastic insulation 156 and a central conductive data lead 158. The cable 108 is permitted to pass through conduit 104 in any length prior to attaching the cable 108 to the conduit 104 at a selected position.

Any type of cable may be used in place of cable 108, as shown in FIG. 1. A cable bundle including a plurality of insulated conductors, such as a twenty-four lead bundle, may be substituted for the data lead 158. The cable bundle may comprise individual wires that are themselves shielded or unshielded. The shielding 152 may be wrapped around this cable bundle and covered, for example, with a shrink wrap to provide insulation layer 150.

Figure 2:
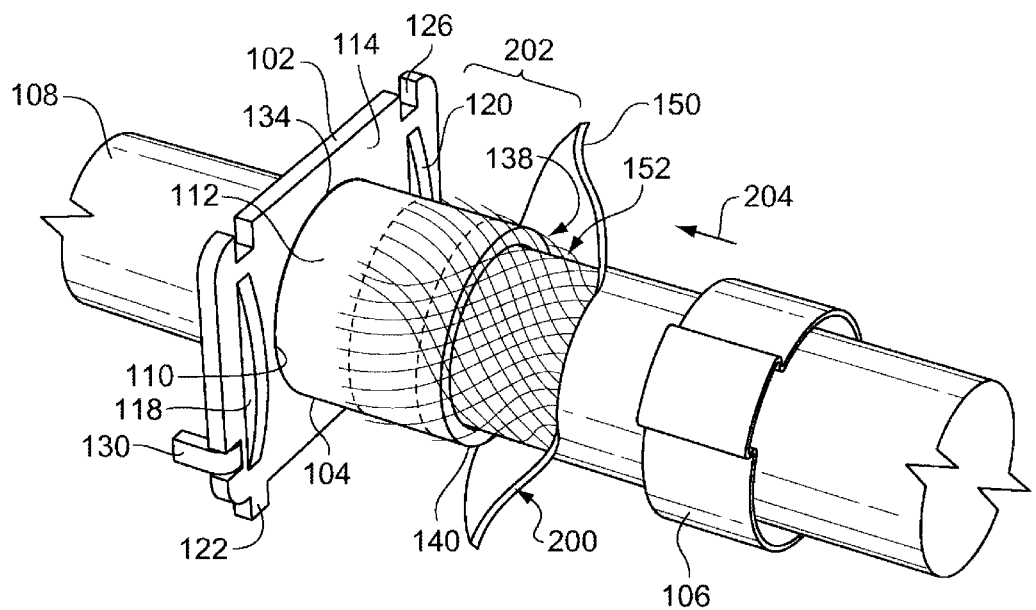
FIG. 2 is a right, front view of partially assembled components from FIG. 1 including cable shielding as it is being connected to ground.

As shown in FIG. 2, the end plate 102 has been press-fit with conduit 104. Cable 108 has been inserted through passageway 138 and clamp 106. A flap 200 of the elastomeric insulative layer 150 has been opened to expose the shielding 152. The shielding 152 has been cut or partially cut to produce strands 202 located radially outboard with respect to exterior wall 112. The metal clamp 106 is being advanced in the direction of arrow 204 towards portion 146 where clamp 106 will be crimped, thus establishing a ground pathway between the shielding 152 and the grounded conduit 104 through strands 202. The flap 200 may be completely excised, or it may be folded over the strands 202 to cover as much surface area as is possible. As shown in FIG. 2, the shielding has been cut in a rearward position proximate conduit 104 and raised so that free rearward sliding motion of the cable 108 relative to the conduit 104 pushes the shielding 152 over the exterior wall 112 of conduit 104. Alternatively, the shielding may be cut at a forward position and folded rearwardly over the exterior wall 112. Still other methods of installation may include, for example, cutting half of the shielding 151 at a forward position or rearward position, so as not to disrupt electrical continuity of the shielding in rearward portions of cable 108.

Figure 3:
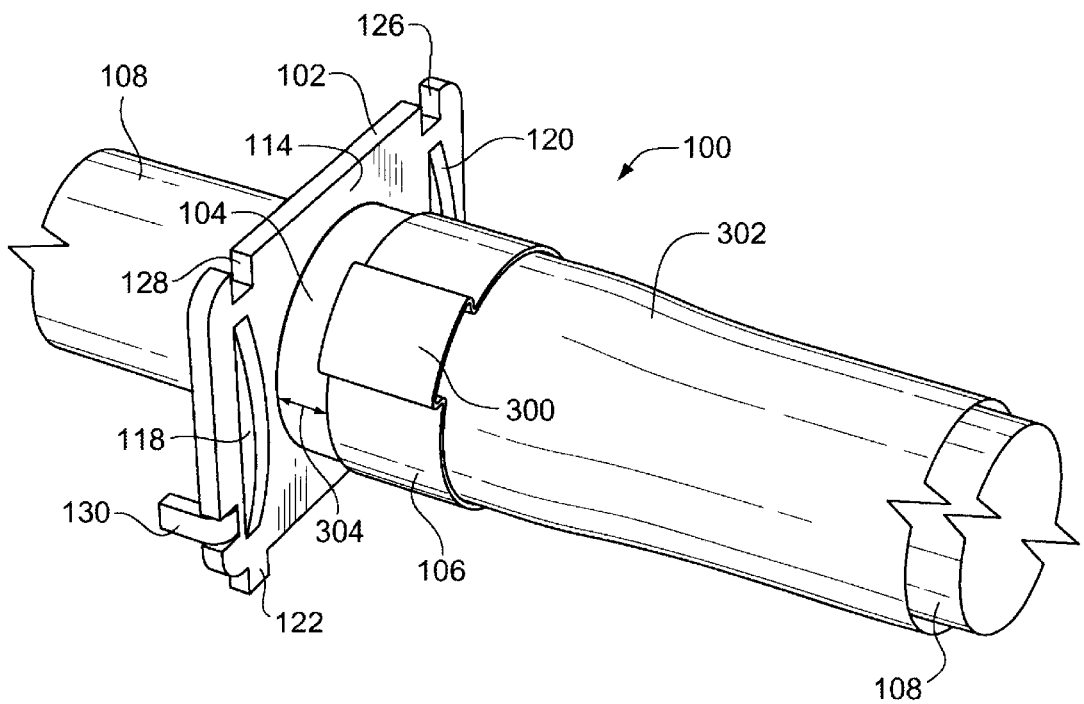
FIG. 3 is a right, front elevational view of the cable retention device components of FIG. 1 in final assembly.

FIG. 3 depicts the completed assembly of cable retention device 100. A crimp 300 is formed in clamp 106. An optional covering 302, such as a rubber boot, shrink wrap, or shielded cable connector, may be installed over conduit 104 to impart additional stability. The clamp 106 is installed to provide a gap 304 comprising a predetermined distance between the end plate 102 and the clamp 106.

Figure 4:
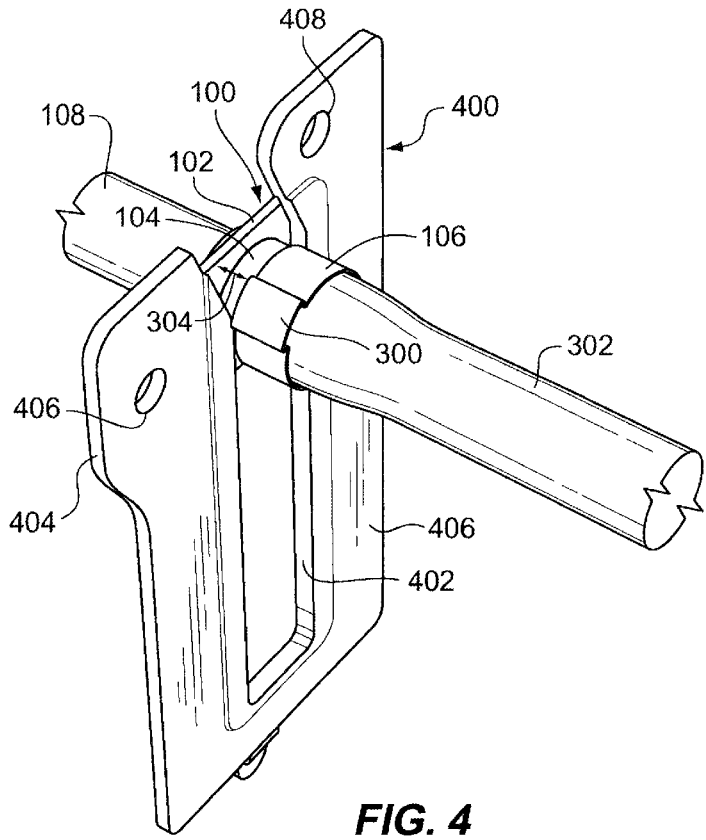
FIG. 4 is a right, front elevational view of the cable retention device of FIG. 3 during installation into a guide rail mounting bracket.

FIG. 4 depicts the cable retention device 100 during insertion into a guide rail bracket 400. A slot 402 has sufficient dimensions to permit passage of the conduit 104, but not the end plate 102 and not the clamp 106. Thus, the predetermined distance of gap 304 permits the conduit 104 to slide between a pair of opposed guide rails 404 and 406. The guide rails are provided with a pair of upper holes for receipt of a threaded fastener that is not shown in FIG. 4.

Figure 5:
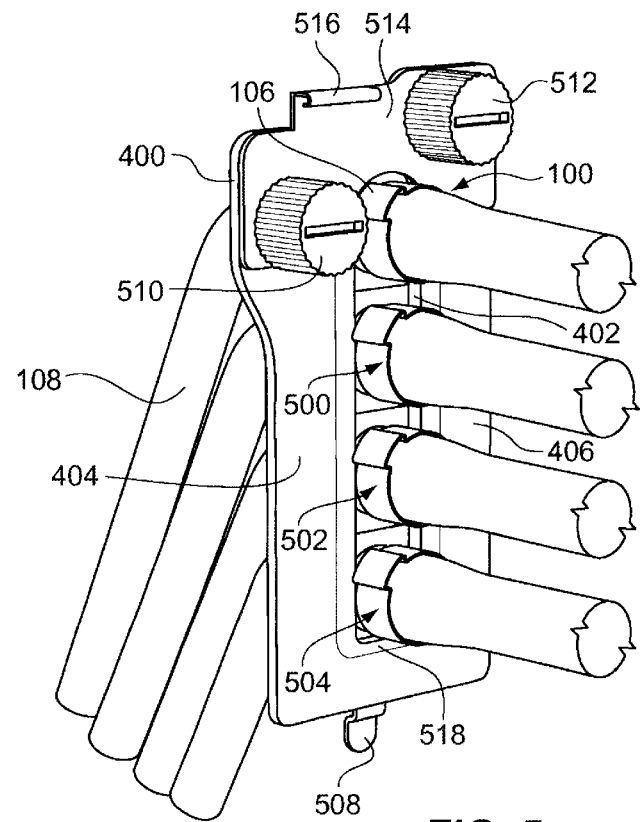
FIG. 5 is a right, front elevational view of the guide rail mounting bracket supplied with a plurality of identical cable retention devices of the type shown in FIG. 3.

FIG. 5 is a front elevational perspective view depicting the cable retention device 100 installed into the guide rail bracket 400 adjacent a plurality of identical cable retention devices 500, 502, and 504. The cable retention devices 100 and 500–504 are stacked atop one another to position the male bosses 122 and 124 of one such cable retention device into the female slots 126 and 128 (see FIG. 1) of the next such cable retention device in descending order. The ears 130 and 132 of each end plate 102 protrude rearwardly and are not visible from the perspective of FIG. 5. The guide rails 404 and 406 are connected by an integrally formed bottom segment and downwardly protruding L-tab 508. Threaded fasteners or bolts 510 and 512 extend through the apertures 406 and 408 shown in FIG. 4, as well as a top plate 514 that connects the top ends of guide rails 404 and 406. The top plate 514 is bent to form a clip 516, which facilitates electrical contact between the top plate 514 and a chassis (not shown) to enhance EMI containment. The inner margin of slot 402 is bent forwardly to provide an abutment 518 including sufficient rearward space to accommodate the respective end plates 102 of the cable retention devices 100 and 500–504.

Figure 6:
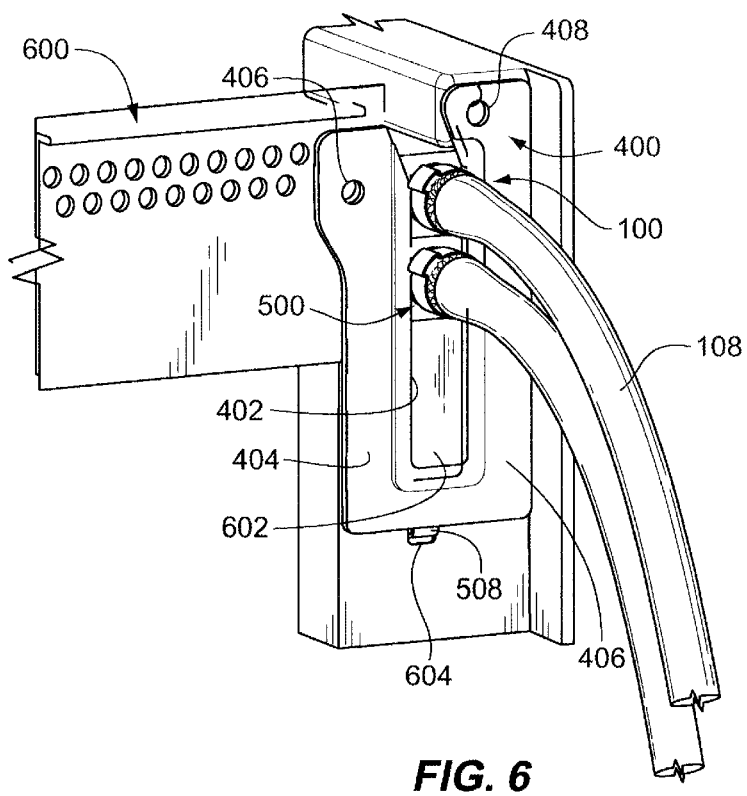
FIG. 6 depicts the guide rail mounting bracket containing two of the cable retention devices during installation onto a chassis that is used to house electrical equipment.

FIG. 6 shows the guide rail bracket 400 as it is being installed on a grounded conductive chassis 600. The chassis 600 may be any type of chassis that houses electrical equipment, and preferably contains a high speed telecommunications or computer system. As shown in FIG. 6, the guide rail bracket contains the cable retention device 100, as well as the cable retention device 500. A mounting blank 602 resides below the cable retention device 500 to occupy excess space in the slot 402. The L-tab 508 engages a complimentary receptacle for selectively and releasably mounting the L-tab to the chassis 600, e.g., with use of female threaded apertures, such as aperture 604.

Figure 7:
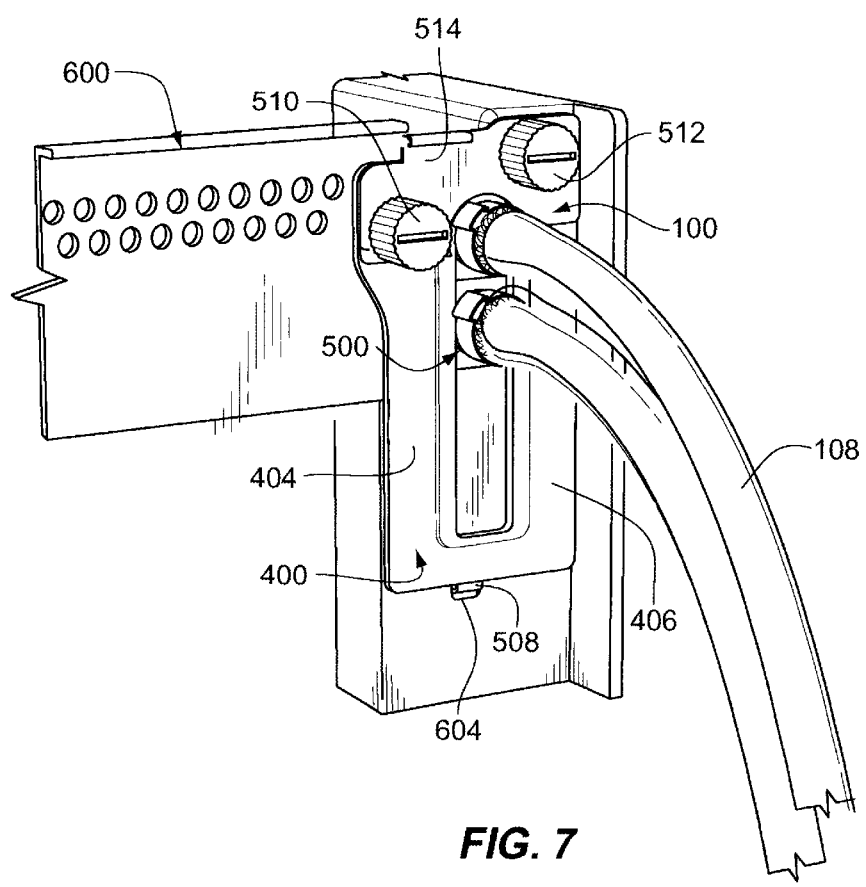
FIG. 7 depicts the including the guide rail mounting bracket containing two of the cable retention devices after final installation onto the chassis.

FIG. 7 depicts the guide rail bracket 400 after the final step of installation in which the threaded fasteners 510 and 512, as well as top plate 514 have been installed to compress the respective end plates 102 of the cable retention devices 100 and 500. The threaded fasteners 510 and 512 engage complimentary threaded opening in the chassis. Torque on the threaded fasteners 510 and 512 causes the guide rails 404 and 406 to flex towards the chassis 600 over the respective arches 118 and 120, which are shown in FIG. 1 and function as fulcrums to this effect. The final assembly provides a very stable platform that essentially eliminates torsional and translational movement of the respective cables, such as cable 108 while assuring that the shielding on the respective cables is grounded to the chassis 600.

The foregoing discussion is intended to illustrate the concepts of the invention by way of example with emphasis upon the preferred embodiments and instrumentalities. Accordingly, the disclosed embodiments and instrumentalities are not exhaustive of all options or mannerisms for practicing the disclosed principles of the invention. The inventors hereby state their intention to rely upon the Doctrine of Equivalents in protecting the full scope and spirit of the invention.

What is claimed is:

1. A cable retention device for use in securing shielded cables, comprising:
   a cylindrical conduit,
   the cylindrical conduit presenting an exterior surface;
   an end plate defining an aperture,
   the cylindrical conduit extending from a first end remote from the end plate to a second end joined with the end plate at the aperture to define a continuous passageway having sufficient clearance for passage of the shielded cable through the end plate and the cylindrical conduit, and
   a clamp having dimensions compatible with the cylindrical conduit for use in circumscribing a portion of the exterior surface and retaining a piece of the shielded cable between the clamp and the portion of the exterior surface when the piece of shielded cable is clamped therebetween.

2. The cable retention device of claim 1, further comprising a shielded cable including a piece of shielding clamped between the clamp and the exterior surface to establish a ground between the shielding and the cylindrical conduit.

3. The cable retention device of claim 1, wherein the clamp comprises a metal ring band.

4. The cable retention device of claim 1, wherein the cylindrical conduit is made of a conductive material.

5. The cable retention device of claim 1, wherein the end plate comprises a front face having a fulcrum proximate the cylindrical conduit.

6. The cable retention device of claim 1, wherein the cylindrical conduit and the end plate are joined by a mechanism selected from the group consisting of press fits, integral formation of parts, and a bonding composition.

7. A cable retention device for use in securing shielded cables, comprising:
   a conduit,
   the conduit presenting an exterior surface; and
   an end plate defining an aperture,
   the conduit joined with the end plate at the aperture to define a continuous passageway having sufficient clearance for passage of the shielded cable through the end plate and the cylindrical conduit,
   the conduit presenting an axis of symmetry,
   the end plate comprising at least one male boss protruding transversely with respect to the axis of symmetry.

8. The cable retention device of claim 7, wherein the end plate comprises a female slot located distal from the male boss, the female slot having compatible dimensions for mating receipt therein of members of identical size in respect to the male boss when such members are available for mating receipt within the female slot.

9. The cable retention device of claim 8, the end plate presenting a front face forming a plane in transverse orientation with respect to the axis of symmetry, the end plate comprising an alignment ear protruding rearwardly beyond the front face.

10. A cable retention device for use in securing shielded cables, comprising:
    a conduit,
    the conduit presenting an exterior surface; and
    an end plate defining an aperture,
    the conduit joined with the end plate at the aperture to define a continuous passageway having sufficient clearance for passage of the shielded cable through the end plate and the cylindrical conduit,
    the conduit presenting an axis of symmetry,
    the end plate presenting a front face forming a plane in transverse orientation with respect to the axis of symmetry, the end plate comprising an alignment ear protruding rearwardly beyond the front face.

11. A cable retention device for use in securing shielded cables, comprising:

a conduit, the conduit presenting an exterior surface; and an end plate defining an aperture, the conduit joined with the end plate at the aperture to define a continuous passageway having sufficient clearance for passage of the shielded cable through the end plate and the cylindrical conduit, the end plate forming a front face circumscribing the aperture, the cable retention device further comprising a guide rail bracket having an opening of sufficient size to permit passage of the conduit while not permitting passage of the front face.

12. The cable retention device of claim 11, the guide rail bracket having a first end and a second end remote from the first end, the first end comprising a mounting tab for use in retaining the guide rail in complimentary mounting structure when the guide rail bracket is installed in the complimentary mounting structure.

13. The cable retention device of claim 12, the second end comprising an opening with a threaded fastener received therein for use in demountably attaching the guide rail bracket to the complimentary mounting structure when the guide rail bracket is installed in the complimentary mounting structure.

14. The cable retention device of claim 13, wherein the front face comprises a fulcrum proximate the guide rail bracket for use in flexing the guide rail bracket under force exerted by the threaded fastener is installed in the complimentary mounting structure.

15. The cable retention device of claim 14, further comprising the complimentary mounting structure.

16. The cable retention device of claim 11, wherein the conduit and the end plate form a unit, and comprising a plurality of identical such units stacked adjacently in the guide rail.

17. A cable retention device comprising:

a conduit means for permitting passage of a shielded cable;

means joined with the conduit means for retaining the conduit means in a fixed position; and means for coupling the conduit means with a shield portion of the cable without crimping of the cable apart from the shield portion.

18. A method of affixing an insulated and shielded cable to a cable retention device, the cable retention device including a conduit and an end plate joined to present a continuous passageway, the method comprising the steps of:

clamping the end plate in a bracket;

removing insulation from the insulated and shielded cable to expose shielding in the cable;

positioning the shielding around the conduit; and clamping the shielding to the conduit.

19. The method as set forth in claim 18, further comprising a step of stacking a plurality of identical cable retention devices in the bracket.

* * * * *